United States Patent [19]

Schippers et al.

[11] Patent Number: 4,478,562
[45] Date of Patent: Oct. 23, 1984

[54] OIL LUBRICATION OF VACUUM PUMP WITH PULSATING OIL FEED

[75] Inventors: Heinz Schippers, Remscheid; Siegfried Hertell, Radevormwald, both of Fed. Rep. of Germany

[73] Assignee: Barmag Barmer Maschinenfabrik AG, Remscheid-Lennep, Fed. Rep. of Germany

[21] Appl. No.: 420,802

[22] Filed: Sep. 21, 1982

Related U.S. Application Data

[63] Continuation of Ser. No. 115,206, Jan. 25, 1980, abandoned.

[30] Foreign Application Priority Data

Dec. 8, 1979 [DE] Fed. Rep. of Germany ....... 2857494
Dec. 24, 1979 [DE] Fed. Rep. of Germany ....... 2952401

[51] Int. Cl.$^3$ ................... F04C 18/00; F04C 23/00; F04C 29/02
[52] U.S. Cl. ................... 418/88; 418/93; 418/94; 137/624.13; 251/345; 251/352
[58] Field of Search .......... 418/1, 88, 93, 94; 184/35, 6.16; 137/624.13, 624.15; 251/345, 352

[56] References Cited

U.S. PATENT DOCUMENTS

| 2,050,533 | 8/1936 | Huff | 418/93 |
| 2,324,903 | 7/1943 | Beckman | 418/93 |
| 2,500,719 | 3/1950 | Ungar | 418/88 |
| 2,522,824 | 9/1950 | Hicks | 418/93 |
| 2,737,341 | 3/1956 | Bitzer | 418/76 |
| 2,801,791 | 8/1957 | Walter | 418/93 |
| 4,231,728 | 11/1980 | Hertell | 418/94 |
| 4,355,963 | 10/1982 | Tanaka et al. | 418/94 |

Primary Examiner—John J. Vrablik
Attorney, Agent, or Firm—John H. Shurtleff

[57] ABSTRACT

A method and apparatus for lubricating a vacuum pump, preferably a rotary vane vacuum pump, wherein the pump rotor is mounted on a hollow drive shaft continuously fed with a lubricating oil stream under excess pressure from an oil pump, radial openings being provided in the hollow shaft for the outward supply of lubricating oil to the elements being lubricated with the lubricating oil stream from said oil pump being fed under excess pressure as a pulsating and preferably intermittent flow stream into the interior of the hollow shaft.

14 Claims, 14 Drawing Figures

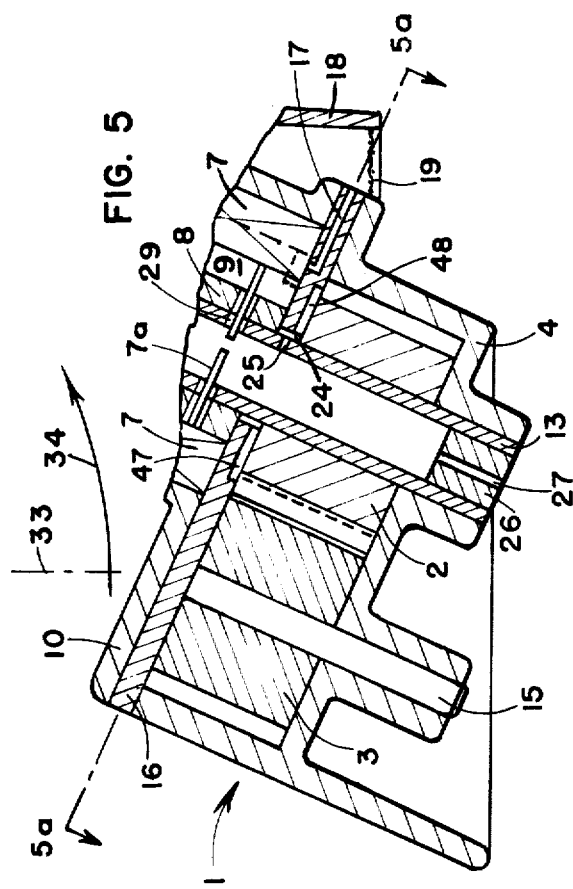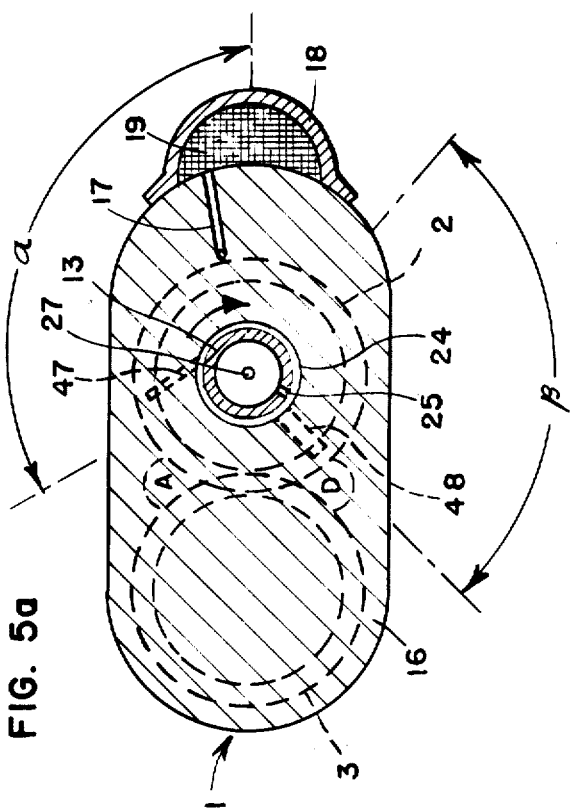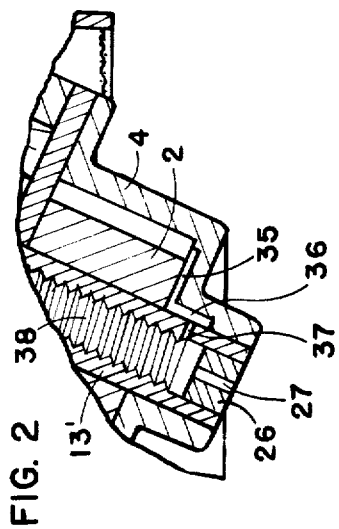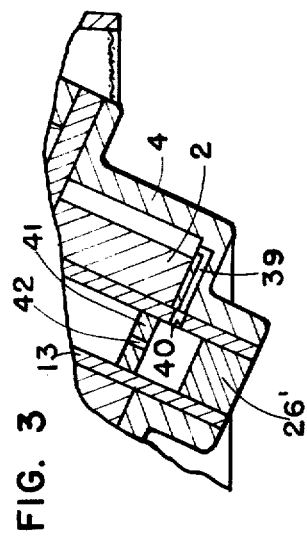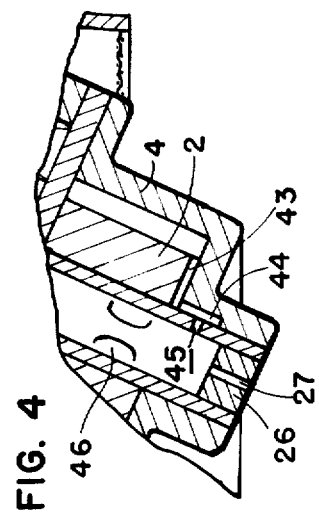

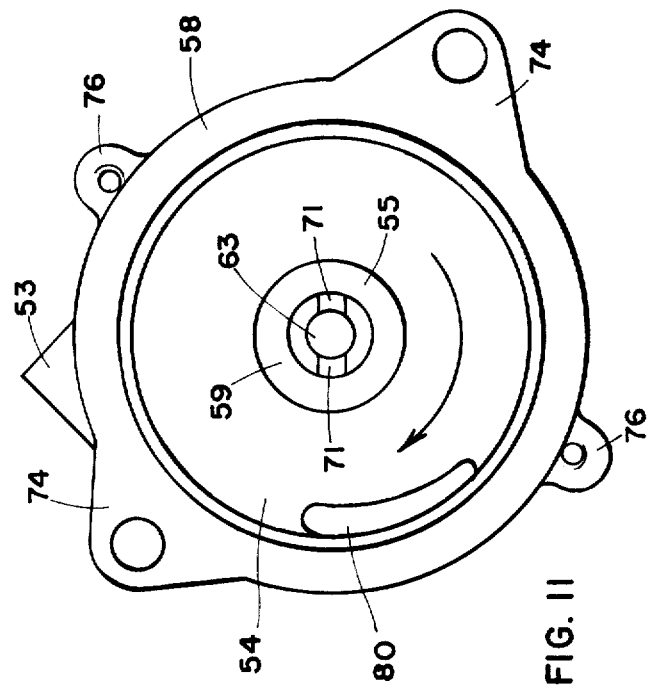
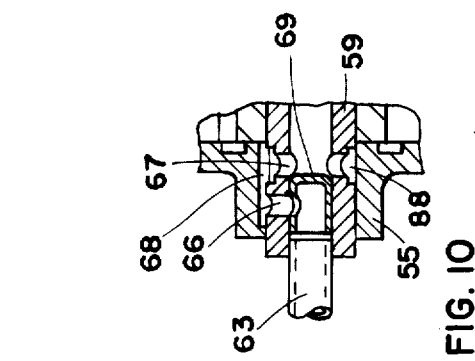
FIG. 10
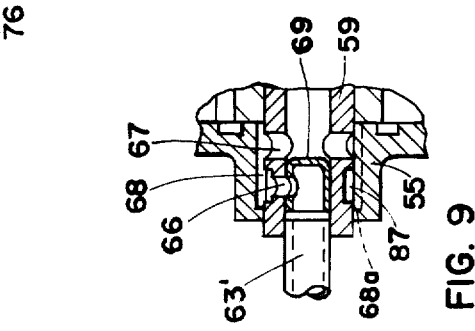
FIG. 9
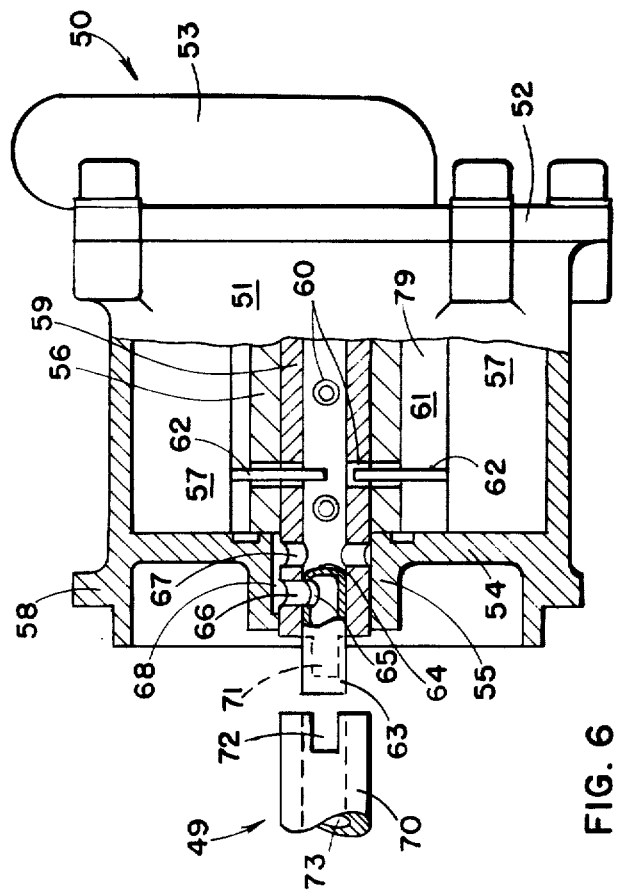
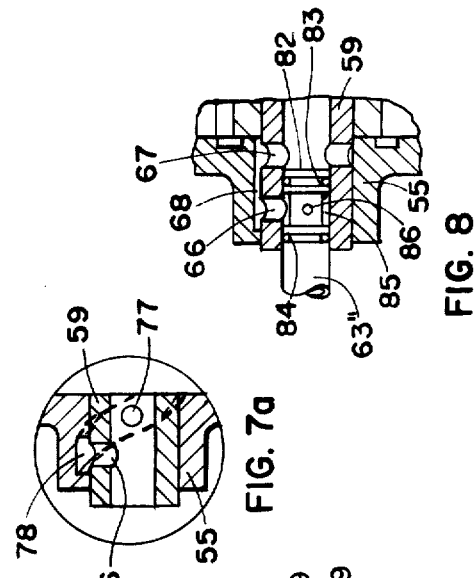
FIG. 8
FIG. 7a
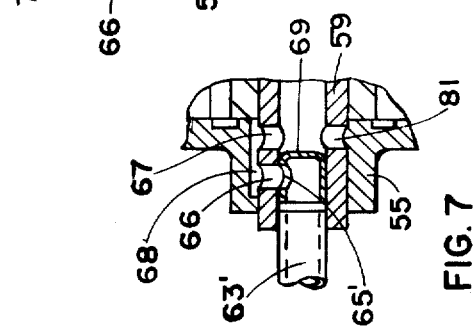
FIG. 7

OIL LUBRICATION OF VACUUM PUMP WITH PULSATING OIL FEED

This is a continuation of application Ser. No. 115,206 filed Jan. 25, 1980 abandoned.

BACKGROUND OF THE INVENTION

The invention relates to the oil lubrication of a vacuum pump, especially a rotary vane vacuum pump, and the improved construction of such a pump.

Internal combustion engines, especially those that operate according to the four-stroke cycle system, have a so-called "pressure lubrication", or "circulating forced lubrication". Here, the lubricating oil is conducted from an oil pump or oil pan through an oil pump, in particular a gear wheel pump, to the individual points of lubrication (see Dubbel's Pocket Handbook for Machine Construction, 12th Edition, Vol. II, p. 206).

Motor vehicles also frequently have a brake pressure amplifier, i.e. a power assisted braking system. Such brake pressure amplifiers contain a pneumatic piston or diaphragm system operated by a vacuum. This vacuum is preferably generated by a pump unit driven by the combustion engine of the motor vehicle. Rotary vacuum pumps have been used more and more to generate the vacuum, preferably using those constructed as rotary vane pumps.

A rotary vane pump of the type used in the present invention is known for example from U.S. Pat. No. 2,324,903 and No. 2,801,791. In these rotary vane pumps, the oil stream for sealing thr radially movable vanes with respect to the rotor and the housing is fed in under a high oil pressure and, in particular, from the end of the hollow shaft which lies opposite the drive end and which is therefore placed under less mechanical stress. The vanes of these known pumps are driven outwardly by centrifugal force and additionally by the hydraulic effect of the lubricating oil pressed into the vane base spaces. This causes a high mechanical wear on the vane tips, especially at high turning speeds, and also places an increased energy requirement on the vacuum pump, since the radially outwardly driven vanes have to be pushed back, as the rotor turns, against the oil pressure built up in the vane base spaces.

In the German Utility Pat. No. 77 07 853 (U.S. application Ser. No. 886,545, filed Mar. 14, 1978 now U.S. Pat. No. 4,231,728), a rotary vane pump has been proposed in which the lubricant feed line is arranged in the pump drive shaft to extend axially as a rigid feed line into the hollow shaft of the pump, being connected by an axially flexible coupling or bridge to the drive shaft. In this arrangement, the excess oil delivered by the oil pump of the central lubricating system runs off from the hollow shaft substantially free of pressure and is returned to the oil sump. In such an open lubricating system for the rotary pump, the oil is sucked into the vane base spaces as the vanes travel outwardly and is then displaced from the base spaces as the vanes are radially retracted into these spaces, without the occurrence of any increased power consumption. This desirable operation is aided by the fact that at high rotor velocities, the oil is foamed due to the action of the double pins of the vanes as they are moved back and forth at high speed, and the oil in this foamed state can be compressed much more easily.

One disadvantage found in the open lubricting system according to this German Utility Pat. No. 77 07 853 resides in the need to lubricate the bearings and to seal the moving vanes both in the rotor and in the casing by branching off a relatively large partial stream from the oil stream conveyed under pressure by the oil pump, i.e. using a very large excess amount of circulated oil. A limitation of the amount of oil directed to the rotary vane pump, however, would lead to rising oil temperatures and a corresponding decreasing viscosity of the lubricating oil so that the oil supply to the vacuum pump would not always be sufficient, and under unfavorable conditions, the level of the vacuum, i.e. the reduction in pressure, would become smaller and smaller. Yet another disadvantage resides in the increased power requirement placed on the gear wheel pump to handle the required amounts of lubricating oil.

SUMMARY OF THE INVENTION

One object of the present invention is to make available a pressure-feed oil lubrication of a vacuum pump which avoids the above-described disadvantges. More particular, in order to avoid cloggings due to impurities by using sufficiently large feed line cross sections, it is an object of the present invention to deliver into the hollow shaft of the vacuum pump precisely only as much lubricating oil as is required for proper lubrication. Furthermore, it is an object of the invention to build up only a relatively low, controllable pressure of the lubricating oil in the hollow shaft. In addition, it is an object of the invention to automatically adjust the lubricating oil pressure in the vacuum pump with increasing rotor speeds, especially so as to reduce the power requirements of the pump at high speeds and to reduce the mechanical wear on the vane tips, while also providing a relativly high pressure at low rotor speeds to ensure a tight vacuum seal.

These and other objects and advantages of the invention are achieved by a method which comprises feeding the lubricating oil stream from the oil pump under excess pressure as a pulsating flow stream, preferably with intermittent flow, into the interior of the hollow shaft. This method is broadly applicable to any vacuum pump having a hollow drive shaft for the pump rotor supplied with a continuous feed of lubricating oil from the oil pump under excess pressure, i.e. above atmospheric pressure, radial openings being provided in the hollow shaft for the outward supply of lubricating oil to the rotor elements being lubricated. However, the invention is particularly useful in the operation of a rotary vane vacuum pump wherein individual vanes are arranged to slide within radial slits of the pump rotor, and the radial openings is the hollow drive shaft supply oil to these radial slits, e.g. to vane base spaces in which the vanes slide back and forth.

In a vacuum pump, preferably a rotary vane vacuum pump, having such a hollow drive shaft fed with oil under pressure from the oil feed line of an oil pump and provided with radial openings to outwardly supply lubricating oil to the rotor elements, the improvement of the present invention broadly comprises a movable oil-conducting channel segment arranged for repeated movement at least partly in and out of said feed line to vary the feed cross-section and rotational drive means to produce said repeated movement, thereby causing said lubricating oil to flow as a pulsating stream into the interior of the hollow shaft. The movable channel segment is preferably arranged to repeatedly open and close the oil feed line so as to produce an intermittent, pulsating flow stream.

The vacuum pump of the invention advantageously includes at least one fixed oil-conducting channel segment located in a housing for said hollow shaft and at least one movable oil-conducting channel segment located in a rotatable pump member such that said fixed and movable channel segments are alternately conected and disconnected to produce an intermittent, pulsating flow stream. Said at least one movable channel segment is preferably located as a substantially radial bore passing through the hollow shaft at an axial position located outside of the region of the vacuum pump rotor, e.g. in a bearing member such as a bearing eye, sleeve, bushing or the like in which a journal section of the hollow shaft is rotatably mounted.

In an especially preferred embodiment of the invention, the vacuum pump includes a hollow shaft with a journal section projecting axially from said rotor at one end thereof, said journal section being rotatably supported in a bearing eye of said housing, at least one set of paired radial channel segments in said journal section at positions axially spaced from each other within said bearing eye, partition means in said hollow shaft to seal off its hollow interior between the paired channel segments, and at least one fixed oil-conducting channel segment extending in axial direction within said bearing eye to intermittently connect the paired channel segments. Other embodiments of the invention having especially preferred structural features are disclosed in greater detail by the following specification and the accompanying claims which are to be included in this specification by reference as part of the disclosure of the invention.

THE DRAWINGS

The invention is also illustrated by the embodiments shown or suggested by the accompanying drawings in which:

FIGS. 2, 3 and 4 are partial sectional views at the lower end of the hollow shaft of FIG. 1, illustrating a number of different arrangements for the fixed and movable channel segments of the oil feed line leading into the hollow shaft;

FIGS. 5 and 5a are sectional views, similar to FIGS. 1 and 1a in order to illustrate an alternative oil feed from the oil pump into the hollow shaft;

FIG. 6 is a partial axial section of a preferred rotary vane vacuum pump of the invention having an oil feed line introduced at one end of the hollow drive shaft with fixed axial and movable radial oil-conducting channel segments arranged in the housing bearing and journal section of the hollow shaft, respectively;

FIG. 7 is a partial sectional view of one modification of the oil feed line to provide another preferred construction at the feed end of the hollow shaft;

FIG. 7a illustrates another alternative oil feed line construction based on FIG. 7 but with a fixed axial channel segment which extends in a winding or helical path in the housing bearing;

FIGS. 8, 9 and 10 are also partial axial sections to show other suitable feed line connections and arrangements of the fixed and movable channel segments in the housing bearing; and FIG. 11 is an elevational view of the rotary vane vacuum pump of FIG. 6 as seen from the driven end of the pump.

DETAILED DESCRIPTION OF THE INVENTION

The invention offers as one general embodiment, which is illustrated by FIGS. 1 through 5a, a rotary vane vacuum pump 6 mounted on a common hollow drive shaft 13 with the oil pump 1, preferably a gear wheel pump, used for the oil lubricating system of an internal combustion engine, for example wherein the vacuum pump is commonly used to produce a vacuum to operate the power brakes of a motor vehicle. The combined pumps of this embodiment are readily contained in a single structural unit or combined housing which is partly immersed in the oil pan or oil sump of the internal combusion engine such that the lubricating oil is taken in on the vacuum side of the oil pump and circulated from the pressure side of the oil pump through a conventional lubricating circulation system of the engine, one branch conduit being produced as an oil feed line with fixed and movable channel segments between the pressure side of the oil pump and the common hollow shaft. In the other general embodiment of the invention, as illustrated by FIGS. 6 through 11, the vacuum pump is advantgeously a separate structural unit with an oil feed line from any suitable pump means being directed into one end of a hollow drive shaft which rotates the rotor and vane elements of the preferred rotary vane vacuum pump.

Figure 1:
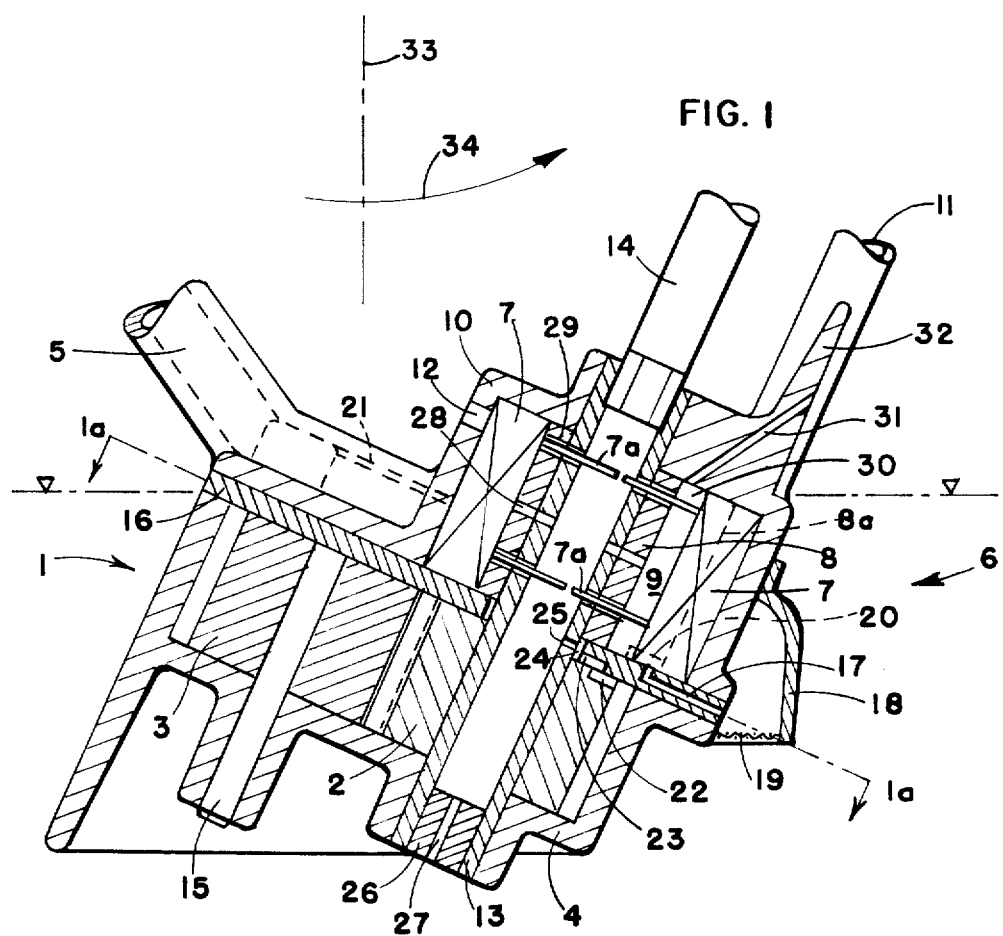
FIGS. 1 and 1a are sectional views taken axially and transversely, respectively, of a combination oil pump and rotary vane vacuum pump according to the invention having a common hollow drive shaft and adapted to be mounted in the oil pan of an internal combustion engine, e.g. in a motor vehicle.
Figure 1A:
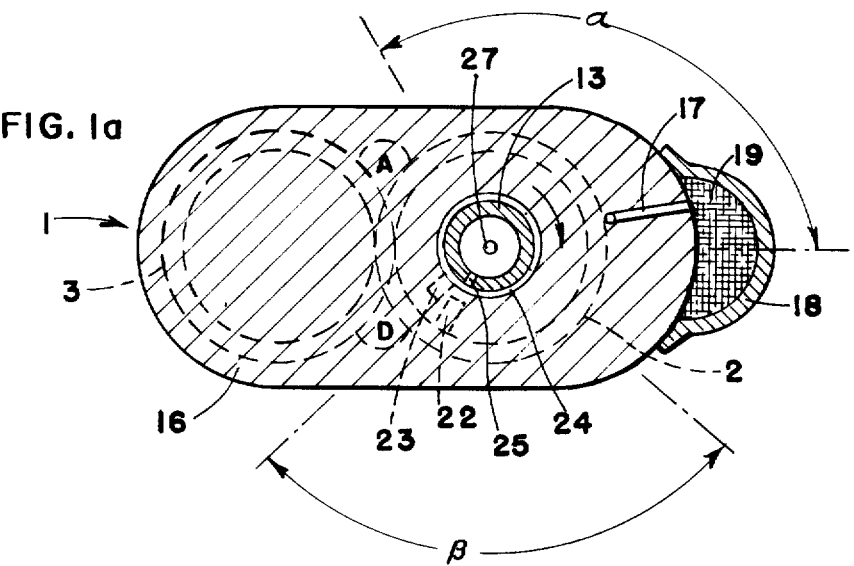

The combined oil and vacuum pump unit, as shown most completely in FIGS. 1 and 1a, has the advantage of providing a very compact structural unit with relatively short and commonly enclosed oil-conducting conduits or channels leading between the oil pump and the common hollow drrive shaft. If the unit is positioned in an oil pan with the hollow shaft axis at an angle to the horizontal, preferably 45° or more as shown, the lower end of the hollow shaft are located below the oil level as indicated by the oil level of line ∇ in FIG. 1. Part of the vacuum pump also lies below this oil level, but at least the upper portion projects above the oil level, i.e. at the drive end of the hollow shaft.

In all of the embodiments based on this combined oil and vacuum pump of FIGS. 1 and 1a, the amount of lubricating oil apportioned to the rotary vane vacuum pump can be accomplished by suitable choke means and/or said means for producing a pulsating and preferably intermittent feed, all of these measures being applicable individually or in combination with each other depending upon practical demands and the prescribed operating conditions of the vacuum pump. For example, one can provide a pulsating stream which is never interrupted, e.g. merely varying the cross section in a periodic manner to produce pulsations. This can be done using a first stream which is constant as to pressure and amount and superimposing thereon a second stream which is varied as to pressure and amount. It is preferable, however, to periodically interrupt the lubricating oil feed line leading into the hollow drive shaft so as to provide an intermittent feed.

The amount of oil can also be controlled according to the invention by an appropriate selection of the channel cross sections, by the frequency and duration of individual connections of channel segments and by the oil pressure applied to the oil feed line. It is especially desirable to control the pulsating flow rate of the oil stream into the hollow shaft by making it dependent on the rotational speed of the oil pump or the turning rate of the hollow shaft of the vacuum pump rotor, especially in a carefully determined relationship with the individual channel cross sections.

In the various specific embodiments of the invention, the general principle of an intermittent, pulsating flow is based, in one instance, on the idea that the pressure side of the oil pump may be steadily tapped through a stationary or fixed channel system which is arranged in the housing surrounding the hollow shaft of the vacuum pump and that this channel system is periodically connected and disconnected, according to the turning of the hollow shaft, with the interior of the hollow shaft and thereby with the vacuum pump elements to be lubricated. The dosing or metering of the lubricating oil through the oil feed line in this manner takes place, on the one hand, through the selection of the individual cross sections of the channel system and, on the other hand, through the number of radial bores or passageways arranged in the mantle or casing wall of the hollow shaft. In another instance, the intermittent oil feed is accomplished by providing a movable channel segment which is executed in a gear wheel of the oil pump, so that again the pressure side of the oil pump is intermittently tapped.

In all cases, however, the radial bores of the hollow shaft or casing should be dimensioned in such a way as to avoid any pressure build-up which would place the hollow shaft under an additional load or stress. The individual radial bores or passageways in the hollow shaft as part of the oil feed line, i.e. as movable channel segments, should generally be located at an axial position outside of the region of the vacuum pump rotor, especially in an adjacent journal section of the shaft mounted for rotation in a suitable bearing, e.g. a plain bearing or any friction bearing such as a sleeve, bushing, or slide bearing member. The bearing member is advantageously utilized to carry at least one fixed channel segment of the oil feed line.

Another preferred embodiment for dosing the vacuum pump provides a continuous oil feed from the pressure side of the oil pump to the hollow shaft wherein a housing fixed channel segment issues into an annular space surrounding the hollow shaft, said annular space also being connected with the suction side of the pump, e.g. on the side away from pressure side, so that a pressure gradient is present in the annular space. On rotation of the hollow shaft, this arrangement leads to a pulsating oil flow and, in the zone of the suction channel, there is an intermittent oil flow into the interior of the hollow shaft.

Referring now to FIGS. 1 and 1a, the structural unit consisting of both the oil and vacuum pump is adapted to be accommodated in the oil pan of an internal combustion engine, e.g. an automobile motor, so as to be inclined with respect to the horizontal, as indicated by the oil level ∇. The oil pump 1 has gear wheels 2 and 3 which mesh with one another and are situated in the lower part of the housing 4. The suction opening A of this oil pump is indicated in FIG. 1a, which is a section taken on line 1a—1a of FIG. 1, while line 5 of the oil pump is connected with the pressure side D. This is a conventional arrangement for an oil pump of the gear wheel type.

The vacuum pump 6 is constructed as a rotary vane pump and contains four vanes 7 arranged at 90° intervals around the rotor 8, only two of these vanes being shown in FIG. 1. These vanes are installed in radial slits 9 for reciprocal radial movement during rotation of the rotor 8, which is eccentrically borne on the hollow shaft 13 in the housing 10 so that the vanes form chambers with the rotor 8 and the pump housing 10, these chambers changing in their volume during pump rotation. The vanes 7 are guided by their pins 7a riding in radial openings extending through both the rotor 10 and shaft 13. The vacuum line 11 extends upwardly from the upper portion of the housing 10. The oil and air outlet opening 12 of the vacuum discharges into the oil pan, and more specifically, above the oil level and in a substantially horizontal direction so that oil drops and dirt will not fall into this opening.

The gear wheel 2 of the oil pump and the rotor 8 of the vacuum pump are borne on the common hollow shaft 13. This hollow shaft 13 is coupled at its upper end by means of a hexagon or other suitable coupling means to the drive shaft 14 which in turn is driven by the motor of the internal combustion engine. The gear wheel 3 is over-mounted on the shaft 15 so as to be driven by gear wheel 2. The oil pump and the vacuum pump are separated from one another by the intermediate plate 16 as a common housing member. Oil pump housing 4 and vacuum pump housing 10 are rigidly joined with one another and with this intermediate plate 16. The hollow shaft 13 is borne at its journal ends in plain or sleeve bearings under forced oil lubrication. For the oil lubrication of the vacuum pump elements, there is arranged on the suction side of the pump, —i.e. in the region of angle α of intermediate plate 16 as shown in FIG. 1a (thus below the minimal oil level)—an oil channel 17, which extends first radially and then in axial direction to issue onto an end face surface of the rotor 8 of the vacuum pump 6. In the rotor 8 there is a radial groove 20, which extends from the issuing mouth of the oil channel 17 up to the circumference 8a of the rotor 8. The oil channel 17 is covered over by the cage 18 which is completely closed from above with an intake opening on the bottom containing a filter screen 19. By means of this cage and filter, dirt is prevented from passing into the channel 17.

Through the fixed oil channel 17 and the movable radial groove 20, a discontinuous oil stream is sucked into the vacuum pump due to the vacuum produced in the pump chamber. The frequency and the pulse duration of the oil feed depends in part on the rotational speed of the hollow shaft 13 and also in part on the number of radial grooves 20 in the rotor 8. It will be self-evident that there can be several oil channels 17 present on the vacuum side of the vacuum pump. By proper selection of the size and number of oil channels 17 and radial grooves 20, respectively, the amount of oil fed into the pump can be apportioned such that an excess of lubricating oil in the vacuum pump is prevented.

So that oil can also be fed to the pressure side or outlet side of the vacuum pump, an oil overflow channel 21 is provided between the vacuum pump and the outlet line 5 of the oil pump. This oil feed measure can be provided alone or also in addition to the oil channel 17 with radial groove 20.

For the pulsating lubrication of the vanes 7 as well as the bearings of the hollow shaft 13 according to FIG. 1, the following oil channel system may be used. The gear wheel 2 has a surface groove 22 on its end face adjacent to the intermediate plate 16 which extends from the outer circumference of the gear face in a radial direction and ends at any suitable point of the face surface. During rotation of the gear wheel 2, the radial groove 23 in the intermediate plate 16 as the fixed channel segment forms an intermittently open and closed feed line with the gear wheel face groove 22 as the movable channel segment, these two segments moving periodically into a slightly overlapping position. The fixed groove or channel segment 23 issues into the annular space 24 around hollow shaft 13. The radial bore 25 of the hollow shaft is another movable channel segment which connects the annular space 24 with the interior of the hollow shaft 13.

In FIG. 1a, the groove 23 in intermediate plate 16 is shown as being positioned in the region of the angle $\beta$, i.e. in the pressure zone of the gear wheel pump. Accordingly, an intermittent, pulsating oil stream is conducted over face groove 22, intermediate plate groove 23, annular space 24 and radial bore 25 into the interior of the hollow shaft 13. The hollow shaft 13 is preferably closed by the drive shaft 14 at one end and by a plug 26 at the other end. In order to avoid accumulations of dirt at the bottom end of the hollow shaft 13, the plug 26 has a small axial bore 27, whereby a portion of the oil stream conducted into the hollow shaft is removed through the bore 27 with the dirt or similar impurities which tend to sink downwardly. Otherwise, the lubricating oil stream passes from the interior of the hollow shaft through the lubricating oil openings or radial bores 28 as well as through the guide bores 29 for the pins, thereby entering into the base spaces 30 of the vanes 7. During the radial movement of the vanes 7, the oil forms a thin film on both sides of the vanes along the opposing walls of the radial slits 9.

Two undesirable effects can occur during operation of the vacuum pump. First, in the case of rapid movement of the vanes, i.e. at high rotational speeds of the engine motor as translated to shaft 13 or in the case of a cold and therefore highly viscous oil, there may be insufficient oil passing through the bores 28 and guides 29 into the vane base spaces 30, or secondly, the oil may build up in the vane base spaces to prevent the free radial mobility of the vanes. These problems are alleviated by providing one or more base space ports or exit openings 31. These ports or exit openings 31 are preferably arranged on the suction side of the vacuum pump, i.e., in the zone of the angle $\alpha$ as shown in FIG. 1a. In order to prevent oil or dirt accumulations from penetrating into these suction openings, their mouths are arranged well above the oil level in a rib 32, preferably on the side of the rib 32 which is turned away from the vertical axial plane 33 of the motor shaft (not represented). In this manner, one can ensure that oil spray stirred up by the connecting rod movement 34 does not get into the exit orifices of the ports 31.

In FIG. 2, another embodiment for an intermittent oil feed to the vacuum pump is shown, in particular as designed for lubricating the hollow shaft bearings as well as the reciprocating vanes. This embodiment can replace other feed line configurations or, if need be, can be used together with these other configurations as previously shown. In the oil pump housing 4, there is arranged a radial groove 35, which extends on the pressure side of the pump (see angle $\beta$ in FIG. 1a) from a point near the outer circumference of the gear wheel 2 up to the outer mantle or casing wall of the hollow shaft 13' where it leads into an axial groove 36 in the housing bearing. In the region of this axial groove 36, there is positioned at least one radial bore 37 in the hollow shaft. Through selection of the number and diameter of the radial bore or bores 37, and also the cross-sectional size of the radial and axial grooves 35 and 36, respectively, the amount of lubricating oil conveyed into the interior of the hollow shaft can be apportioned. In order to prevent too great an oil pressure drop in the zone of the outlet pressure line or connection 5 (see FIG. 1) of the gear wheel pump, as caused by oil conduction though the radial groove 35, axial groove 36 and radial bore 37, the interior of the hollow shaft 13 is provided with a choke, throttle or similar flow regulating means. For example, this choke may consist of an inside thread 38, as illustrated in FIG. 2, so as to provide a conveying action in the direction of the plug 26 when the shaft 13' turns in the same direction of rotation as the shaft 13 in FIG. 1a. The plug 26 has a bore 27 which on the one hand is small enough to prevent a pressure drop, but on the other hand is large enough to ensure the discharge of dirt accummulations.

FIG. 2 as well as FIGS. 3 and 4 illustrate only a partial section or fragment of the structural unit given in FIG. 1, with all other pump elements and connections thereto being the same as in FIGS. 1 and 1a.

The specific oil feed line embodiment of FIG. 3 may replace that of FIG. 2 and if desired, may be used in combination with other embodiments shown herein or can suffice by itself as the sole means of providing a pulsating lubricating oil stream to the vacuum pump 6. According to FIG. 3, the oil pump housing 4 has a fixed oil channel 39 which extends with an axial segment and a radial segment from the circumference of the gear wheel 2 up to the mantle or outer casing wall of the hollow shaft 13. The oil channel 39 lies in about the same plane as the radial bore 40 in the hollow shaft, so that an intermittent, pulsating oil flow is produced during the rotation of the hollow shaft 13. The hollow shaft is completely closed off in this case by a plug 26' at the lower end. For a choke or throttle means in place of the thread 38 shown in FIG. 2, one may use the choke plug 41 with choke bore 42 which is placed above the radial feed opening 40 within the hollow shaft, thereby preventing any excessively strong pressure drop on the pressure side of the oil pump.

In FIG. 4, still another embodiment of the oil feed line is given and may replace the embodiments shown in FIGS. 2 and 3 and optionally, may be used along with all other embbodiments and can take the place of all other embodiments. Here, the oil feed line consists of a movable radial surface groove 43 in the bottom end face of gear wheel 2 and a fixed axial groove 44 in the oil pump housing 4. In the zone of axial groove 44 but axially displaced from groove 43, the radial bore 45 in the hollow shaft mantle is locaated in the same axial plane as the surface groove 43 of gear wheel 2 and turns together with this groove 43 so as to intermittently open and close the flow of oil through the fixed axial groove 44. All the other details of the two pumps are described in the preceding embodiments. The possibility of using a choke is schematically indicated in FIG. 4 by the reference numeral 46 and one may choose any suitable choke means similar to those already shown.

In FIGS. 5 and 5a, the combined oil pump and vacuum pump unit corresponds essentially to that shown in FIGS. 1 and 1a, except for the arrangement of the oil feed line segments. In this case, the fixed annular channel 24 and the movable radial bore 25 are joined by a fixed radial groove 48 arranged in the lower face of the intermediate plate 16. This radial groove 48 extends in one course from the pressure side of the oil pump 1 (angle $\beta$ in FIG. 5a) to the annular space 24, so that the annular space 24 is charged with a continuous oil stream. On the side of the annular space 24 away from the radial groove 48 there is connected the substantially radial suction channel 47, which connects the annular space with the suction side A of the oil pump 1. Thereby there arises in the annular space 24 a pressure drop between the mouth of the radial groove 48 and the mouth of the suction channel 47. Accordingly, an oil stream flows through the radial bore 25 of the hollow shaft 13 into the interior of this hollow shaft 13. The amount of oil in this conveyed stream steadily pulsates in correspondence to the pressure distribution in the annular space 24.

The advantage of the intermittent oil feed as well as of the oil feed from the oil pan directly into the vacuum pump 6 resides in the fact that, on the one hand, there is no need to fear a drop of the oil pressure generated by the oil pump to any harmful degree, while on the other hand, the oil channel segments leading to the vacuum pump 6 can be made so large that the unavoidable accumulations of dirt do not lead to clogging or any serious pump damage.

The peceding embodiments of FIGS. 1 through 5a are all directed to a vacuum pump which together with an oil pump forms a compact structural unit in which one gear wheel of the oil pump and the pump rotor are arranged on the same hollow drive shaft and are synchronously driven. The two pump units are separated by a common intermediate plate, which is advantageously used to arrange the fixed channel segments of the lubricating oil feed line.

This particular structural unit of a combined oil pump and rotary vane vacuum pump is designed to be seated in the oil pan of the internal combustion engine's forced oil circulation system and with the suction connecting line or the oil inlet of the gearwheel pump being arranged for immersion in the lubricating oil supply, so that an oil conveyance to all the points of lubrication is ensured. However, special care may be required to prevent the vacuum pump from becoming completely filied with lubricating oil, in order not to endanger the evacuation of the power brake system in certain operating settings.

The principle of a pulsating and intermittent oil feed to the vacuum pump has prooved to be especially valuable, since through a controlled dosing it has become possible to control the oil pressure in the vacuum pump in such a way that in starting up the motor of the drive means or at low turning speeds, the oil pressure in the hollow shaft and in the vane base spaces is relatively high and contributes to a forcing out of the vanes and thus ensures a radial pressing of the vane tips on the housing inner walls so as to generate a sufficiently high vacuum. At high turning speeds, in contrast, the oil pressure decreases in a predeterminable manner so as to decrease the power requirements of the pump rotor. It may be pointed out here that in determining such power needs, the oil pressure build up in the vane base spaces is controlling, since this is the pressure required to push back the vanes into the rotor in the region of the compression zone.

A substantial improvement has been further achieved in accordance with the embodiments of FIGS. 6 through 11 where a pressure oil lubrication with a pulsating oil stream is achieved in a vacuum pump, especially a rotary vane vacuum pump, which is presented as a self-contained unit with a rotatable hollow shaft which is driven by an internal combustion engine, especially by a cam shaft of the engine motor, the lubricating oil being introduced in a continuous or semi-continuous stream in axial direction into the hollow shaft of the vacuum pump. In this improvement, the vacuum pump is a separate structural unit being fed by oil circulating under pressure from any suitable oil pump so as to enter the hollow shaft axially from one end and then, in the axial region of the journal bearing of the hollow shaft, to flow outwardly through a first radial shaft opening, axially in a fixed channel in the bearing housing and then inwardly through a second radial shaft opening into the interior of the hollow shaft. The hollow shaft has a pressure-tight or sealed partition extending transversely of the shaft axis so that the hollow interior is closed off between the first and second radial shaft openings at the feed end of the shaft, thereby creating a relatively short feed path with the desired intermittent, pulsating flow.

There are a number of expedient arrangements of the radial openings or bores in the vacuum pump hollow shaft and variations may also be made in their connection with the fixed axial channel segment in the bearing. The object is to control the lubricating oil feed into the hollow shaft and, additionally, to bring about a good lubrication of the bearing surfaces in the pump hollow shaft. In another development of the invention, the transverse partition or flow-blocking member in the pump hollow shaft can be favorably made as a pressed-in cap or as a tube insert closed at its end, and the fastening and sealing of this cap or tube insert in the pump hollow shaft takes into consideration possible faults in alignment of the drive shaft and the pump hollow shaft.

By means of the intermittent pressure oil lubrication at the feed end of the pump hollow shaft, according to this preferred embodiment of the invention, it is possible to carefully dose the pulsating oil stream in dependence on the rotational speed of the hollow shaft and, especially at high rotational speeds and high cnveyance efficiency of the oil pump, to decrease the lubricating oil pressure in such a way that the power requirement for the vacuum pump is greatly reduced. A further important advantage of a lower lubricating oil pressure at high turning speeds is the fact that the mechanical wear on the wing tips declines sharply. This reduced wear occurs, notwithstanding the effect of high centrifugal forces, because an additional high static pressure of the vane tips on the inner wall circumference of the housing is avoided. On the other hand, however, it was also possible to ascertain that the oil pump, even at lower turning speeds of the drive motor, still delivers a sufficiently high lubricating oil pressure to ensure that the individual vanes can be completely driven out radially by the pressure in the vane base spaces, even in the case of cold and highly viscous oil, thus generating a sufficiently high vacuum for an effective brake pressure amplification.

It should be noted that the preferred vacuum pump of the present invention, in particular a rotary vane pump as described in connection with the operation of power brakes in motor vehicles, is not restricted to this preferred utility, but can also be used in many other applications, especially in stationary vacuum generating installations.

As illustrated partly in longitudinal section in FIG. 6, there is generally provided a drive means 49 (shown uncoupled) which operates the preferred rotary vane vacuum pump 50. This vacuum pump includes a pump housing 51 which is tightly closed by the cover 52 carrying the suction or vacuum line 53. The pump housing 51 has a cylindrical hollow interior and contains in the housing base 54 an eccentrically arranged bearing eye 55 to receive the journal section of the hollow shaft 59 for rotation of the rotor 56. The vanes 56 of this rotor are arranged to move radially in the radial slits 61 in known manner. The housing base 54 is formed on its outer circumference as a centering flange 58, in order to secure the rotary vane vacuum pump to the motor housing, preferably coaxially to the cam shaft 70.

The rotatable hollow drive shaft of this rotary vane vacuum pump is constructed as a single elongated shaft 59, which is borne at one journal end in the bearing eye 55 of the housing base 54 and in another similar bearing (not represented) in the cover 52 of the pump. The hollow shaft 59 in the region of the rotor 56 has a number of radial bores 60 through which the lubricating oil is directed outwardly to reduce the friction between the vanes 57 and the rotor 56 in its radial slits 61 as well as to seal the vanes 57 at the outermost tips and along the vane side surfaces between rotor 56 and the pump housing 51. After emerging from the radial bores 60, the lubricating oil passes first into the vane base spaces 79, and then creeps radially outwardly from these spaces as supported by centrifugal forces, and in so doing, seals the gaps present between the vanes and the other pump members. Oppositely disposed vanes 57 in the rotor 56 have at their foot ends the guide pins 62, which are moved back and forth during the rotation of the shaft 59 and rotor 56, sliding in the radial bores 60 and helping to prevent any radial jamming of the vanes 57 as they travel in and out.

According to this embodiment of the present invention, the special lubricating oil feed of the otherwise conventional rotary vane vacuum pump is formed as hereinafter described in detail.

As indicated above, the pump hollow shaft 59 is preferably driven by the cam shaft 70 of an internal combustion engine, wherein the cam shaft 70 and the hollow shaft 59 can have a slight axial spacing and are preferably connected, for example, by a coupling located on the face end of hollow shaft 59 in the form of axially projecting lugs 71 which engage in the corresponding recesses or slots 72 of the cam shaft 70. An axial bore 73 extends through the cam shaft 70 to convey lubricating oil from a gear wheel pump or other suitable oil pump which continuously feeds a supply of oil under full pressure. The cam shaft 70 and the hollow shaft 59 are placed in fluid-tight connection by means of an insert tube 63 which extends coaxially and substantially free of play into the hollow shaft. For the reception of the other projecting end of the insert tube 63 into the cam shaft 70, the feed line in this cam shaft is bored out more strongly over a corresponding axial length.

The insert tube 63 is closed off at its outlet or terminal axial end 64 inside the hollow shaft 59. On its outer circumference, the tube 63 is sealed off with respect to the inner mantle or wall of the hollow shaft 59, for example by a very close, play-free fitting between the shaft and the tube, e.g. a tight press-fit. A corresponding sealing of the insert tube 63 also occurs in the widened bore 73 of the cam shaft 70.

The insert tube 63 contains just before its closed off outlet end 64 a radial bore or opening 65, to which there is allocated a first radial bore 66 in the hollow shaft 59 so as to coincide axially, i.e. in substantially the same normal plane. A second radial bore 67 in the hollow shaft 59 is positioned, as viewed in the lubricating oil feed direction, axially downstream behind the end 64 of the insert tube 63. The two radial bores 66 and 67 in the hollow shaft 59 are connected with one another by at least one substantially axially extending channel 68 fixed in the bearing eye 55 of the housing base 54 at certain angular positions of the driven hollow shaft 59. Thus, as the shaft 59 rotates, the two rotating radial bores 66 and 67 are periodically connected and disconnected through the fixed channel 68, and the rate of pulsations and amount of oil flow are directly dependent on the rotation speed of the hollow shaft.

In the construction shown in FIG. 6, the insert tube 63 is thrust or pressed substantially free of play into the hollow shaft 59. Therefore, no gap space exists between the insert tube 63 and the hollow shaft 59. Because the radial bore 65 in the insert tube 63 and the radial bore 16 in the hollow shaft 59 lie in the same radial plane and are axially aligned with each other, the lubricating oil delivered continuously under high pressure can pass to the outer circumference of the hollow shaft 59 and lubricate the bearing surfaces, but this oil can flow back again through the radial bore 67 into the interior of the hollow shaft 59 only when the two radial bores 66 and 67 of the hollow shaft 59 are placed in fluid communication through the fixed channel 68 provided in the bearing eye 55. A lubricating oil flow thus takes place intermittently and not continuously, because the oil feed is temporarily interrupted, i.e. in most of the rotary positions of the shaft 59. A measured dosing of the amount of oil and thereby also the regulation of the lubricating oil pressure building up in the pump hollow shaft 59 can be influenced by the number of connecting channels 68 provided in the bearing eye 55 and by the number and size of radial bores in the insert tube 63 and in the hollow shaft 59.

According to FIG. 7, a cap 69 or the like drawn into the form of a bowl or pot is pressed into the pump hollow shaft 59 in order to provide the partition which tightly blocks off the interior of the hollow shaft between the two radial passage openings 66 and 67. The mantle or axial extended wall of the cap 69 can also be slightly conical. In this execution, the insert tube 63', which is constructed smoothly and pressed into place with close seating, terminates with an axially spacing in front of the cap 69, and in front of the wall defined by the base or closed end of the cap where it blocks off the interior of the hollow shaft 59. With an appropriate mantle length of the cap 69, a radial bore 65' is aligned with the first radial opening 66 in the shaft which is expediently formed only after the installation of the cap 69.

In FIG. 7a, omitting the rotor, cap and tube portions as seen in FIG. 7, the first radial bore 66 in the shaft 59 is connected over a winding or helical channel 78 in the bearing eye 55 with a second radial bore 77 in the shaft displaced 90° around the shaft circumference from the first bore, but both radial bores having about the same axial interval as in FIG. 7 and the construction and function being otherwise substantially the same as in FIG. 7.

In FIG. 8, a modification of FIG. 7 illustrates a slightly different embodiment wherein the insert tube 63" is closed on its outlet side by the sealing wall 82 which has an annular groove carrying the O-ring 83 as sealing means. This insert tube 63" is closed on its inlet side by a similarly seated O-ring 84 as the sealing means. Between the two sealing means, the annular space 85 is connected with the source of supply of the lubricating oil through the bore or opening 86. Otherwise, this embodiment corresponds to FIG. 7, but it has the advantage that a careful fit between the inlet tube 63" and the bore of the hollow shaft 59 is not required and also that variations in alignment of the hollow shaft 59 with the drive cam shaft 70 (FIG. 6) are given favorable compensation.

In FIGS. 9 and 10, further modifications based on FIG. 7 are shows as variations in the lubricating oil feed line. Alternatively, the annular channel 87 is arranged on the outer circumference of the hollow shaft 59 in the zone of the radial outlet opening 66 as in FIG. 9, or else the annular channel 88 is arranged in the zone of the radial inlet openings 67 and 81. Such an annular channel has the effect that its associated radial inlet or outlet opening is continuously connected to the feed tube 63' or the interior of hollow shaft 59 as a take-off channel, while in each case the other radial passage opening is intermittently connected over the fixed housing channel with the annular channel.

The axial housing channel 68 (or with a second axial housing channel 68a) in the bearing eye 55 is preferably constructed as an axially parallel or winding recess as illustrated herein. However, it may also be formed, for example, as a substantially axially parallel bore in the bearing eye 55 and be connected through suitable radial cut-off channels with the bearing surface in the zone of the radial passage openings 66, 67 or in the zone of the annular channels 87 or 88. These and similar variations in the construction and arrangement of the movable and fixed feed line segments can be easily made without departing from the spirit or scope of the invention.

FIG. 11 is included to provide a view of the rotary vane vacuum pump of FIG. 1 from the drive side. The centering flange 58 is more clearly seen to have bosses 74 and bolt holes for fastening the pump housing to the motor block. In the housing base 54, the kidney-shaped outlet opening 80 is provided for the escape of the compressed mixture of air and oil mist into the crankcase. Finally, in the housing base 54, the bearing eye 55 has the pump hollow shaft 59 borne therein, and one can also more clearly see the axially projecting lugs 71 of the coupling as well as the insert tube 63 for the lubricating oil feed.

The invention is hereby claimed as follows:

1. In a rotary vane vacuum pump having vanes movable in slits of the pump rotor, a rotatable hollow tubular drive shaft for the pump rotor which is operated by rotational drive means, and an oil feed line in fluid connection with the vacuum pump through said hollow tubular drive shaft to provide a stream of lubricating oil thereto under excess pressure from an oil pump, said hollow tubular drive shaft containing radial openings within the rotor for the outward supply of lubricating oil to said slits and to the pump elements being lubricated, the improvement which comprises:

a journal section of said hollow drive shaft which is rotatably supported in a bearing eye of the pump housing at one end of the rotor;
at least one set of paired radial channel segments arranged in said journal section at positions axially spaced from each other within said bearing eye;
partition means in said journal section of the hollow shaft to seal off its hollow interior at a position located axially between the paired radial channel segments;
at least one fixed oil-conducting channel segment arranged within the beaing eye to bridge the axial distance between said paired radial channel segments such that, upon rotation of the hollow drive shaft by said drive means, said fixed and said paired radial channel segments are alternately connected and disconnected to produce an intermittent pulsating flow stream.

2. A vacuum pump as claimed in claim 1 in the form of a rotary vane pump having individual vanes arranged to slide within radial slits of said pump rotor, said radial openings in the hollow drive shaft supplying oil to said radial slits.

3. A vacuum pump as claimed in claim 1 wherein said partition means is formed by a cap member pressed into place and sealed within the hollow shaft.

4. A vacuum pump as claimed in claim 1 wherein said oil feed line includes a feed tube inserted coaxially into the hollow shaft and sealed around its outer circumference against the inner wall of said hollow shaft, a substantially complete seal being made at least at the entry of the hollow shaft before reaching the region of said paired radial channel segments.

5. A vacuum pump as claimed in claim 4 wherein said feed tube is mounted tightly and substantially free of play in said hollow shaft.

6. A vacuum pump as claimed in claim 4 wherein said feed tube is closed at its inserted end to form said partition means and contains a radial passage aligned with the first of the paired radial channel segments closest to the entry into the hollow shaft.

7. A vacuum pump as claimed in claim 4 wherein said feed tube is closed at its inserted end to form said partition means, the inserted tube having an outer diameter smaller than the inner diameter of the hollow shaft to provide radial play in the shaft with radial sealing means positioned before and after the first of said paired radial channel segments to form an annular entry space between the outer circumference of said tube and the inner casing wall of said hollow shaft, said tube having at least one radial feed passage opening into said annular space.

8. A vacuum pump as claimed in claim 1 wherein said fixed channel segment is formed as an axial recess in a sleeve bearing of the bearing eye of said housing.

9. A vacuum pump as claimed in claim 1 wherein said fixed channel segment is formed as a winding recess in a sleeve bearing of the bearing eye of said housing.

10. A vacuum pump as claimed in claim 1 wherein the paired radial channel segments are arranged in about the same plane extending parallel to the axis of the drive shaft.

11. A vacuum pump as claimed in claim 10 wherein at least one additional radial opening is provided in the hollow shaft on about the same normal plane as the second of said paired radial channel segments located after said partition means away from the entry end of the shaft, thereby permitting reentry of lubricating oil outwardly onto the outer circumference of the shaft.

12. A vacuum pump as claimed in claim 10 or 11 wherein at least one further radial opening is provided in the hollow shaft on about the same normal plane as the first of said radial channel segments closest to the entry end of the shaft.

13. A vacuum pump as claimed in claim 1 having a plurality of at least two fixed channel segments formed as recesses extending in axial direction within said bearing eye to intermittently connect a corresponding plurality of said paired radial channel segments, thereby producing the alternating connections at relatively high frequency.

14. A vacuum pump as claimed in claim 1 including an annular channel extending as a circular recess around the outer wall of said journal section of the hollow shaft, said annular channel placing only one of said paired radial channel segments in constant fluid connection with said fixed channel segment.

* * * * *